US009297825B2

(12) United States Patent
Zhang et al.

(10) Patent No.: US 9,297,825 B2
(45) Date of Patent: Mar. 29, 2016

(54) TILT MODE ACCELEROMETER WITH IMPROVED OFFSET AND NOISE PERFORMANCE

(71) Applicant: Analog Devices, Inc., Norwood, MA (US)

(72) Inventors: Xin Zhang, Acton, MA (US); Howard R. Samuels, Newton, MA (US); Michael W. Judy, Ipswich, MA (US)

(73) Assignee: Analog Devices, Inc., Norwood, MA (US)

( * ) Notice: Subject to any disclaimer, the term of this patent is extended or adjusted under 35 U.S.C. 154(b) by 361 days.

(21) Appl. No.: 13/785,624

(22) Filed: Mar. 5, 2013

(65) Prior Publication Data

US 2014/0251011 A1    Sep. 11, 2014

(51) Int. Cl.
*G01P 15/125*    (2006.01)
*G01P 15/08*    (2006.01)

(52) U.S. Cl.
CPC ............... *G01P 15/125* (2013.01); *G01P 15/08* (2013.01); *G01P 2015/0834* (2013.01)

(58) Field of Classification Search
CPC ....................... G01P 15/125; G01P 2015/0831
USPC ........................................................ 73/514.32
See application file for complete search history.

(56) References Cited

U.S. PATENT DOCUMENTS

| | | | |
|---|---|---|---|
| 4,598,585 A | 7/1986 | Boxenhorn | 73/505 |
| 4,670,092 A | 6/1987 | Motamedi | 156/643 |
| 4,869,107 A | 9/1989 | Murakami | 73/517 R |
| 5,331,853 A | 7/1994 | Hulsing, II | 73/505 |
| 6,230,566 B1 | 5/2001 | Lee et al. | 73/514.32 |
| 6,651,500 B2 | 11/2003 | Stewart et al. | 73/511 |
| 6,841,992 B2 | 1/2005 | Yue et al. | 324/162 |
| 7,022,543 B2 | 4/2006 | Eskridge et al. | 438/52 |
| 7,121,141 B2 | 10/2006 | McNeil | 73/514.32 |
| 7,146,856 B2 | 12/2006 | Malametz | 73/514.32 |

(Continued)

FOREIGN PATENT DOCUMENTS

| | | | | |
|---|---|---|---|---|
| DE | 10 2009 045 645 A1 | 4/2011 | ............ | G01P 15/125 |
| EP | 2 479 579 A1 | 7/2012 | ............ | G01P 15/125 |

(Continued)

OTHER PUBLICATIONS

European Patent Office, Communication Pursuant to Rule 69 EPC; Application No. 14156641.4-1558/2775309, 2 pages, Sep. 15, 2014.

(Continued)

*Primary Examiner* — John Chapman, Jr.
(74) *Attorney, Agent, or Firm* — Sunstein Kann Murphy & Timbers LLP

(57) ABSTRACT

A single-axis tilt-mode microelectromechanical accelerometer structure. The structure includes a substrate having a top surface defined by a first end and a second end. Coupled to the substrate is a first asymmetrically-shaped mass suspended above the substrate pivotable about a first pivot point on the substrate between the first end and the second end and a second asymmetrically-shaped mass suspended above the substrate pivotable about a second pivot point on the substrate between the first end and the second end. The structure also includes a first set of electrodes positioned on the substrate and below the first asymmetrically-shaped mass and a second set of electrodes positioned on the substrate and below the second asymmetrically-shaped mass.

21 Claims, 8 Drawing Sheets

(56) References Cited

U.S. PATENT DOCUMENTS

| | | | |
|---|---|---|---|
| 7,210,352 B2 | 5/2007 | Foster et | 73/514.32 |
| 7,578,190 B2 | 8/2009 | Lin et al. | 73/514.29 |
| 7,610,809 B2 | 11/2009 | McNeil et al. | 73/514.32 |
| 8,020,443 B2 | 9/2011 | Lin et al. | 73/514.32 |
| 8,096,182 B2 | 1/2012 | Lin et al. | 73/514.32 |
| 8,171,793 B2 | 5/2012 | Foster | 73/514.32 |
| 8,186,221 B2 | 5/2012 | Lin et al. | 73/514.32 |
| 8,220,330 B2 | 7/2012 | Miller et al. | 73/514.32 |
| 8,539,836 B2 * | 9/2013 | McNeil | 73/514.32 |
| 2006/0021436 A1 | 2/2006 | Kapser et al. | 73/514.38 |
| 2007/0000323 A1 | 1/2007 | Kuisma | 73/514.32 |
| 2008/0110260 A1 | 5/2008 | Konno et al. | 73/514.32 |
| 2009/0139331 A1 | 6/2009 | Axelrod et al. | 73/514.32 |
| 2010/0011860 A1 | 1/2010 | Offenberg et al. | 73/514.32 |
| 2010/0107763 A1 | 5/2010 | Lin et al. | 73/514.32 |
| 2010/0122579 A1 | 5/2010 | Hsu et al. | 73/514.32 |
| 2010/0242600 A1 | 9/2010 | Lin et al. | 73/504.12 |
| 2010/0242603 A1 | 9/2010 | Miller et al. | 73/514.32 |
| 2010/0313660 A1 | 12/2010 | Nishikage et al. | 73/514.32 |
| 2011/0023606 A1 | 2/2011 | Burghardt et al. | 73/514.32 |
| 2011/0056295 A1 | 3/2011 | Classen | 73/514.32 |
| 2011/0154899 A1 | 6/2011 | Classen et al. | 73/514.32 |
| 2011/0203373 A1 | 8/2011 | Konno | 73/514.32 |
| 2011/0290023 A1 | 12/2011 | Takagi | 73/514.32 |
| 2011/0296917 A1 | 12/2011 | Reinmuth et al. | 73/514.32 |
| 2012/0186347 A1 | 7/2012 | McNeil | 73/514.21 |
| 2012/0265481 A1 | 10/2012 | Stewart et al. | 702/141 |

FOREIGN PATENT DOCUMENTS

| | | | |
|---|---|---|---|
| JP | 5-340956 | 12/1993 | |
| JP | 9-189716 | 7/1997 | |
| JP | 2004-340716 | 12/2004 | |
| JP | 2005/529336 | 9/2005 | |
| JP | 2008-139282 | 6/2008 | |
| JP | 2010210425 | 9/2010 | |
| JP | 2012-154919 A | 8/2012 | G01P 15/125 |
| WO | WO 95/24652 A1 | 9/1995 | |
| WO | WO 2008/133183 A1 | 11/2008 | G01P 15/125 |
| WO | WO 2010/055716 A1 | 5/2010 | |

OTHER PUBLICATIONS

European Patent Office, European Search Report, Application No. 14156641.4-1558, 8 pages, Jun. 20, 2014.

Japanese Patent Office, Official Action; Patent Application No. 2014-041260, Jan. 21, 2015; 3 pages.

Japanese Patent Office, Official Action; Patent Application No. 2014-041260, Jan. 21, 2015, 4 pages.

* cited by examiner

TILT MODE ACCELEROMETER WITH IMPROVED OFFSET AND NOISE PERFORMANCE

TECHNICAL FIELD

The present invention relates generally to a tilt-mode type MEMS accelerometer in which two tilt-mode MEMS accelerometers are created on a single substrate.

BACKGROUND OF THE INVENTION

An accelerometer is a type of transducer that converts acceleration into electronic signals. Accelerometers are used in a wide variety of devices and for a wide variety of applications. For example, accelerometers are often included in various automobile systems, such as for air-bag deployment and roll-over detection. Accelerometers are often also included in many computer devices, such as for motion-based sensing (e.g., drop detection) and control (e.g., motion-based control for gaming).

Microelectromechanical systems ("MEMS," also referred to as "MEMS devices") are a specific type of integrated circuit used in a growing number of applications. For example, MEMS currently are implemented as gyroscopes to detect pitch angles of airplanes, and as accelerometers to selectively deploy air bags in automobiles. In simplified terms, such MEMS devices typically have a movable structure suspended above a substrate, and associated circuitry that both senses movement of the suspended structure and delivers the sensed movement data to one or more external devices (e.g., an external computer). The external device processes the sensed data to calculate the property being measured (e.g., pitch angle or acceleration).

Generally speaking, a MEMS accelerometer typically includes, among other things, a proof mass and one or more sensors for sensing movement or changes in position of the proof mass induced by external accelerations. Accelerometers can be configured to sense one, two, three, or even more axes of acceleration. Typically, the proof mass is configured in a predetermined device plane, and the axes of sensitivity are generally referred to with respect to this device plane. For example, accelerations sensed along an axis parallel to the device plane are typically referred to as X or Y axis accelerations, while accelerations sensed along an axis perpendicular to the device plane are typically referred to as Z axis accelerations. A single-axis accelerometer might be configured to detect just X or Y axis accelerations or just Z axis accelerations. A two-axis accelerometer might be configured to detect X and Y axis accelerations or might be configured to detect X and Z axis accelerations. A three-axis accelerometer might be configured to detect X, Y, and Z axis accelerations.

One category of Z-axis accelerometer uses a proof mass that is configured in a "tilt-mode" configuration, where the proof mass is supported from a substrate such that the proof mass rotates relative to the substrate under Z-axis acceleration. Sense electrodes placed below (e.g., on the underlying substrate) or both above and below the proof mass, which in many types of accelerometers are capacitively coupled with the proof mass, are used to sense such rotation of the proof mass and thereby to sense Z-axis acceleration.

SUMMARY OF VARIOUS EMBODIMENTS OF THE INVENTION

A single-axis tilt-mode microelectromechanical accelerometer structure for measuring acceleration about a single axis and method of use are disclosed. In one embodiment, the accelerometer structure includes a substrate having a top surface defining a plane substantially perpendicular to the single axis, the substrate having a first end and a second end. The accelerometer structure includes a plurality of asymmetrically-shaped mass that are suspended above the substrate. The first asymmetrically-shaped mass pivotable about a first pivot axis located between the first end and the second end and the second asymmetrically-shaped mass is pivotable about a second pivot axis located between the first end and the second end. Each asymmetrically-shaped mass includes a set of electrodes. The first set of electrodes are positioned on the substrate and below the first asymmetrically-shaped mass. The second set of electrodes positioned on the substrate and below the second asymmetrically-shaped mass.

In certain embodiments of the invention, the first pivot axis for the first asymmetrically-shaped mass is centered between the first end and the second end of the substrate and substantially parallel to the plane of the substrate. The second pivot axis for the second asymmetrically-shaped mass may be centered between the first end and the second end of the substrate and substantially parallel to the plane of the substrate.

The accelerometer structure may include a first torsional spring mechanically coupled to the first asymmetrically-shaped mass and the substrate and may also include a second torsional spring mechanically coupled to the second asymmetrically-shaped mass and the substrate. The accelerometer structure may also have one or more anchors. For example, a first anchor may be centrally positioned with respect to the first and second ends of the substrate and mechanically coupled to the first asymmetrically-shaped mass. Similarly, a second anchor centrally may be positioned with respect to the first and second ends of the substrate and mechanically coupled to the second asymmetrically-shaped mass.

Embodiments of the accelerometer structure may have each mass suspended by a single anchor. It should be recognized that each mass may form its own teeter-tooter accelerometer and that each of the accelerometers may operate independently or in unison as a single accelerometer.

In certain embodiments, the first set of electrodes includes a plurality of electrodes that are equally positioned from the first pivot axis on the substrate. In other embodiments, the second set of electrodes includes a plurality of electrodes that are equally positioned from the second pivot axis on the substrate. In other embodiments, the first pivot axis and the second pivot axis are equivalent.

Embodiments of the accelerometer structure may include the first set of electrodes having at least two electrodes that are each equally positioned on opposite sides of the pivot axis and the second set of electrodes having at least two electrodes that are each equally positioned on opposite sides of the pivot axis wherein an electrode from the first set of electrodes is cross-coupled with an electrode from the second set of electrodes on an opposite side of the pivot axis. The coupling of the electrodes may be in differential mode.

In another embodiment, a single-axis tilt-mode microelectromechanical accelerometer structure is disclosed. The accelerometer structure includes a substrate having a top surface defining a first axis and a second transverse axis, the top surface having a length defined in the direction of the first axis and a width defined in the direction of the second axis. Additionally, the accelerometer structure includes, a first tilt-mode sensor having an asymmetrically-shaped proof mass coupled by an anchor to the substrate wherein the anchor is substantially centered along the length of the substrate. Finally, the accelerometer structure includes a second tilt-mode sensor having an asymmetrical shaped proof mass coupled by an anchor to the substrate wherein the anchor is centered along the length of the substrate.

The proof mass of the first tilt mode accelerometer may rotate about the anchor along the second axis and is asymmetrical about the second axis. The anchor of the first tilt-mode sensor may be positioned to reduce rotation about the first axis in response to an external stimulus. The accelerometer structure may further include circuitry electrically coupled to the first set of electrodes and to the second set of electrodes and to the first mass and the second mass, the circuitry configured to sense rotational movement of the first mass caused by Z-axis accelerations via changes in capacitance between the first mass and the corresponding first set of electrodes and sense rotation movement of the second mass caused by Z-axis accelerations via changes in capacitance between the second mass and the corresponding second set of electrodes.

The present disclosure also describes a method for using a single-axis tilt-mode microelectromechanical accelerometer structure. The microelectromechanical accelerometer structure to an external stimulus. The external stimulus causes a first tilt-mode sensor coupled to a substrate of the microelectromechanical accelerometer structure having an asymmetrical mass to rotate about a centrally located anchor point. A first electrical signal representing a change in capacitance between the proof mass of the first tilt-mode sensor and the electrode is received at an electrode. The external stimulus causes a second tilt-mode sensor coupled to the substrate of the microelectromechanical accelerometer structure having an asymmetrical mass to rotate about a centrally located anchor point. At a second electrode a second electrical signal representing a change in capacitance between the mass of the second tilt-mode sensor and the second electrode is received. The first electrical signal and the second electrical signal are combined to produce a an acceleration signal. The acceleration signal that is produced may be a differential signal.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

As defined herein the term "electrode" may refer to either sensing electrodes for sensing a signal or drive electrodes for driving a signal unless the context dictates otherwise. Additionally, the term "anchor" shall refer to a part of a "suspension structure" for suspending a mass. The suspension structure may include one or more flexures, such as torsional springs that allow the mass to rotate about an axis of rotation. The anchor of the suspension structure is mechanically coupled with the substrate of a MEMS device.

Figure 1A:
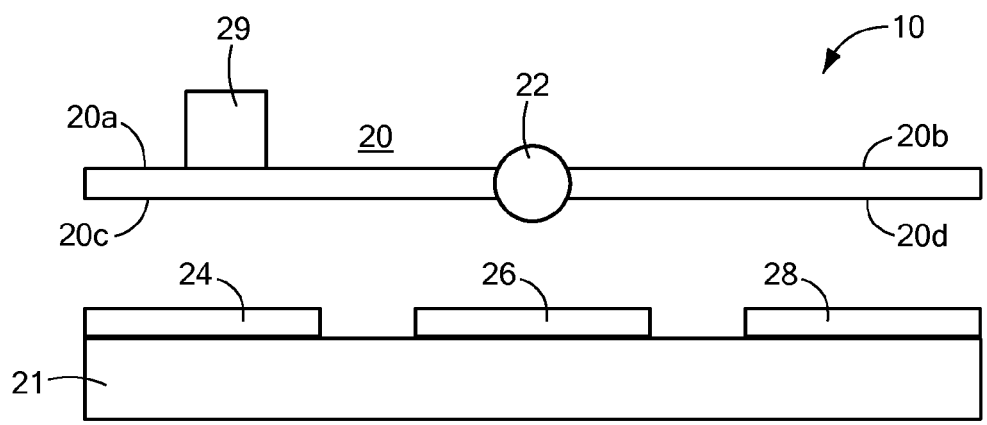
FIGS. 1A-1B schematically show a balanced tilt-mode accelerometer.
Figure 1B:
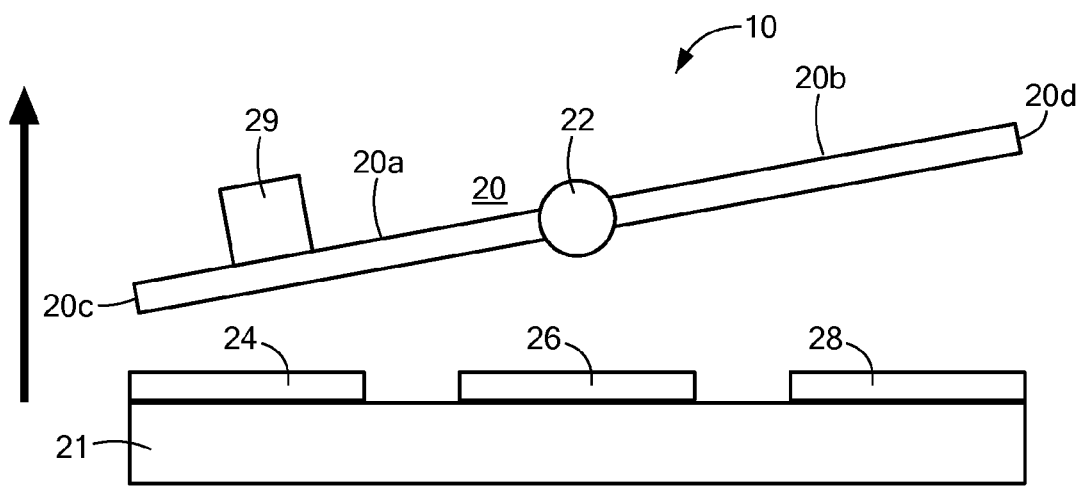

FIGS. 1A-1B schematically show an exemplary tilt-mode accelerometer 10 configured in accordance with an illustrative embodiment of the invention. The embodiments shown in the figures are implemented as a single die having microstructure for determining acceleration in a direction generally normal to its top surface. To that end, the die shown in FIGS. 1A and 1B includes a mass 20 suspended above a substrate 21 having electrodes 24 and 28. Electrodes 24 and 28 are coupled capacitively to the suspended mass 20, and therefore can act as sensing electrodes for sensing movement of the mass 20. As discussed below, application of an appropriately directed acceleration to the mass 20 causes it to rotate about an axis of rotation, which is identified in the drawings by reference number "22." The two sections 20a and 20b of the suspended mass 20 on either side of the axis of rotation 22, between its two lateral ends 20c, 20d respectively, are substantially symmetric with respect to the axis of rotation 22 in illustrative embodiments.

FIGS. 1A-1B may be used to show a principle of operation of the tilt-mode accelerometer 10. FIG. 1A shows the device under an absence of external acceleration, in which capacitances are measured at sensing electrodes 24, 28 to calibrate the zero-gee point of the device. It should be understood by one of ordinary skill in the art that electrodes 24, 28 may also be drive electrodes wherein the suspended mass includes electrodes that would be sense electrodes. In the exemplary figure as shown, if the measured capacitances are not equal, the device will have a bias, or offset, that must be compensated. In FIG. 1A an asymmetry of the beam mass is represented by block 29. This asymmetry assures that there is a mass offset and therefore rotation will occur in response to a linear acceleration in the Z direction.

FIG. 1B shows the same MEMS accelerometer 10 subject to an external acceleration in the direction of the arrow (the positive-Z direction). Because of the moment of inertia caused by the greater mass on portion 20a than portion 20b of the suspended mass, a counter-clockwise torque is generated about the axis of rotation 22, causing the mass to rotate as shown. Acceleration in the opposite direction will cause a rotation in the opposite direction. Rotation in either direction is detected as a varying capacitance on electrodes 24, 28, which have become closer to and further from the suspended mass 20, respectively. The angular deflection of the mass, and hence the size of the variation in capacitance, is related to the magnitude of the acceleration according to an approximately linear conversion function over the range of interest that may be computed or calibrated. Therefore, conventional circuitry (not shown) may apply the conversion function to convert the respective measured capacitances from electrodes 24, 28 into a magnitude of acceleration. Typically, this magnitude is embodied as an output voltage signal on a die or chip package that is indicative of the received/detected acceleration. A proportionality constant is provided to convert between a number of output millivolts and the number of measured gees of acceleration. It should be recognized by one or ordinary skill in the art that previous section describes an analog output from an accelerometer. The present invention is not limited to analog embodiments and a digital signal may be produced by the accelerometer without changing the nature of the invention wherein the appropriate digital circuitry would be employed.

On-chip or off-chip circuitry thus can determine the precise amount of acceleration sensed by the accelerometer 10 based on these changing capacitance signals. For example, the off-chip circuitry can include another die implemented as an application specific integrated circuit (ASIC) that is within the same package as the accelerometer 10, or in another package. Some embodiments may combine the accelerometer die and the ASIC die in a manner where the ASIC die forms a cap on the accelerometer die. Alternatively or in addition, the off-chip circuitry can also include discrete elements and/or multiple circuitry chips.

As noted, the accelerometer 10 typically has some apparatus to protect its fragile microstructure. Accordingly, as noted, the accelerometer 10 may be positioned within a conventional semiconductor package, such as a ceramic cavity package, a pre-molded leadframe package, a carrier package, or some other package-level device. The package preferably is hermetically sealed in various embodiments, and contains a buffering and/or oxidization mitigation gas to further protect the microstructure.

Other embodiments simply cap the die with either a circuit die (e.g., the ASIC noted above) or an inactive cap. Either type of packaging method (i.e., package-level package or die-level package, among others) thus also includes interconnection leads or pads so that the accelerometer 10 can communicate with devices that are external to the package. For example, the package may be mounted to a printed circuit board (e.g., surface mount, through-hole connection, or other type of connection), which may be within a larger system, such as an automobile airbag control system or mobile telephones.

Figure 2A:
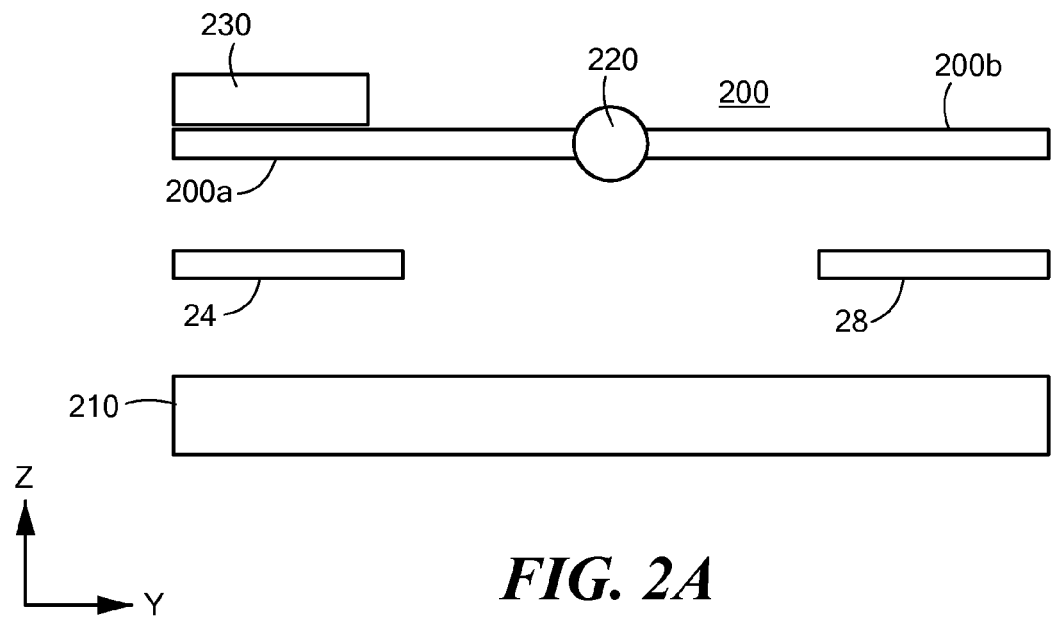
FIG. 2A schematically shows a side view of a tilt-mode accelerometer with an asymmetrically-shaped mass wherein the asymmetry is about the Z direction.
Figure 2B:
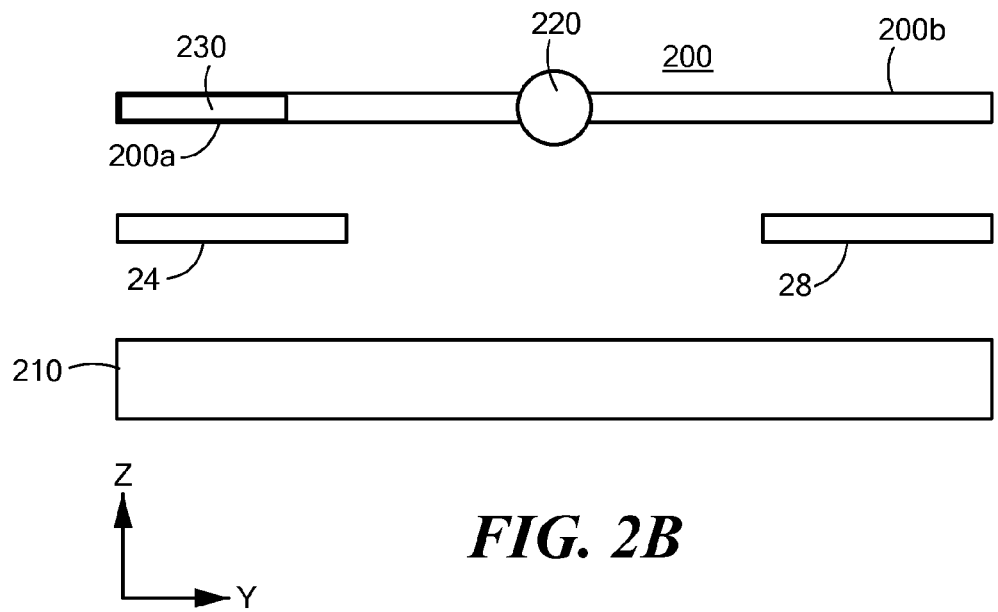
FIG. 2B schematically shows a side view of a tilt-mode accelerometer with an asymmetrically-shaped mass wherein the asymmetry is in the plane of view.

MEMS tilt-mode accelerometers measure acceleration in a preferred direction by means of measuring a torque about the axis of rotation. FIG. 2A shows a side view of a MEMS tilt-mode accelerometer in the ZY plane. The proof mass 200 is suspended above a substrate 210 and the proof mass is centered about the substrate, but has an off-center center of mass but a central pivot point (anchor attachment point) 220, so that more mass is on one side of the axis than on the other side as represented by block 230. The proof mass may be suspended above the substrate by a suspension structure including torsional bar or torsional spring wherein the bar/spring is supported by one or more anchors coupled to the substrate. Block 230 is drawn so as to show that more mass is present on the left side of the proof mass than on the right side. FIG. 2B shows the additional mass as represented by block 230 preferably in the plane of view, so as to facilitate typical semiconductor manufacturing processes. An overhead view of such a configuration is shown in FIG. 3B in which the proof mass extends along the X axis. This uneven distribution of mass results in a moment of inertia about the axis of rotation. When an acceleration is produced in a direction perpendicular to the substrate 210 along the Z-axis, the moment of inertia results in a torque about the axis of rotation 220, causing the suspended mass 200 to rotate. An effective spring constant caused by stresses in the suspension counterbalances the torque, so that under constant acceleration, a fixed angle is obtained after a short time. The angle of rotation, and hence the magnitude of the acceleration, may then be measured.

The distance between the substrate and the suspended mass often is measured by sensing a capacitance between the rotating mass 200 and one or more stationary electrodes 24, 28, which are positioned on the substrate 210. These electrodes 24, 28 are spaced equidistantly on opposite sides of the axis of rotation, so the capacitance changes oppositely for each electrode as the mass rotates. The accelerometer may be calibrated for non-zero accelerations by applying different voltages to one or more driving electrodes to produce an electrostatic force about the axis of rotation. The suspended mass 200 will deflect a certain distance, but will resist further deflection due to the presence of the effective mechanical spring constant.

As with many other MEMS devices, accelerometers experience asymmetrical stress after manufacturing dues to the different distances from the electrodes to the center of the package. These stresses may cause an undesired output reading when no acceleration is actually present causing an unintended offset bias. This disadvantage is addressed by symmetrically disposing the sensors about the centerline of the substrate. Additionally, in the design of a MEMS "tilt-mode" accelerometer it is desirable to have a single anchor at the center of the substrate ('die') along the axis of rotation, since the substrate itself is apt to be uneven (i.e. non-planar) due to standard processing techniques causing unequal stresses. By placing the pivot point at the center of the die, the unevenness on both sides of the pivot point will statistically cancel out allowing for substantially equal mechanical movement in the Z direction about the pivot point. If more than one anchoring point for the beam is present and the substrate is uneven, the anchor can result in unwanted torque being applied to the accelerometer, thus producing inaccurate acceleration measurements results.

Figure 3A:
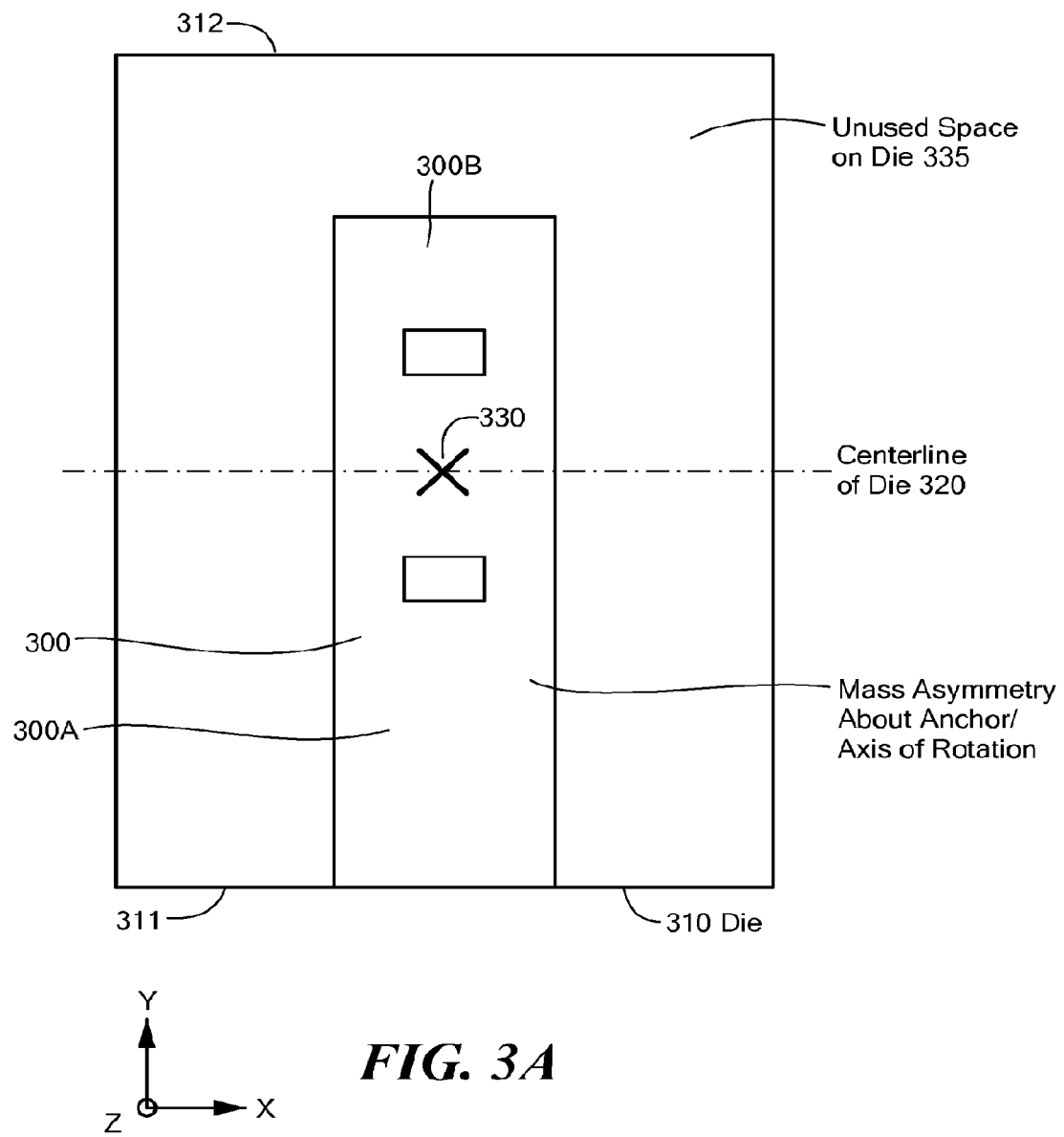
FIG. 3A shows a layout view of a tilt-mode accelerometer with a non-centered pivot axis/anchor.
Figure 3B:
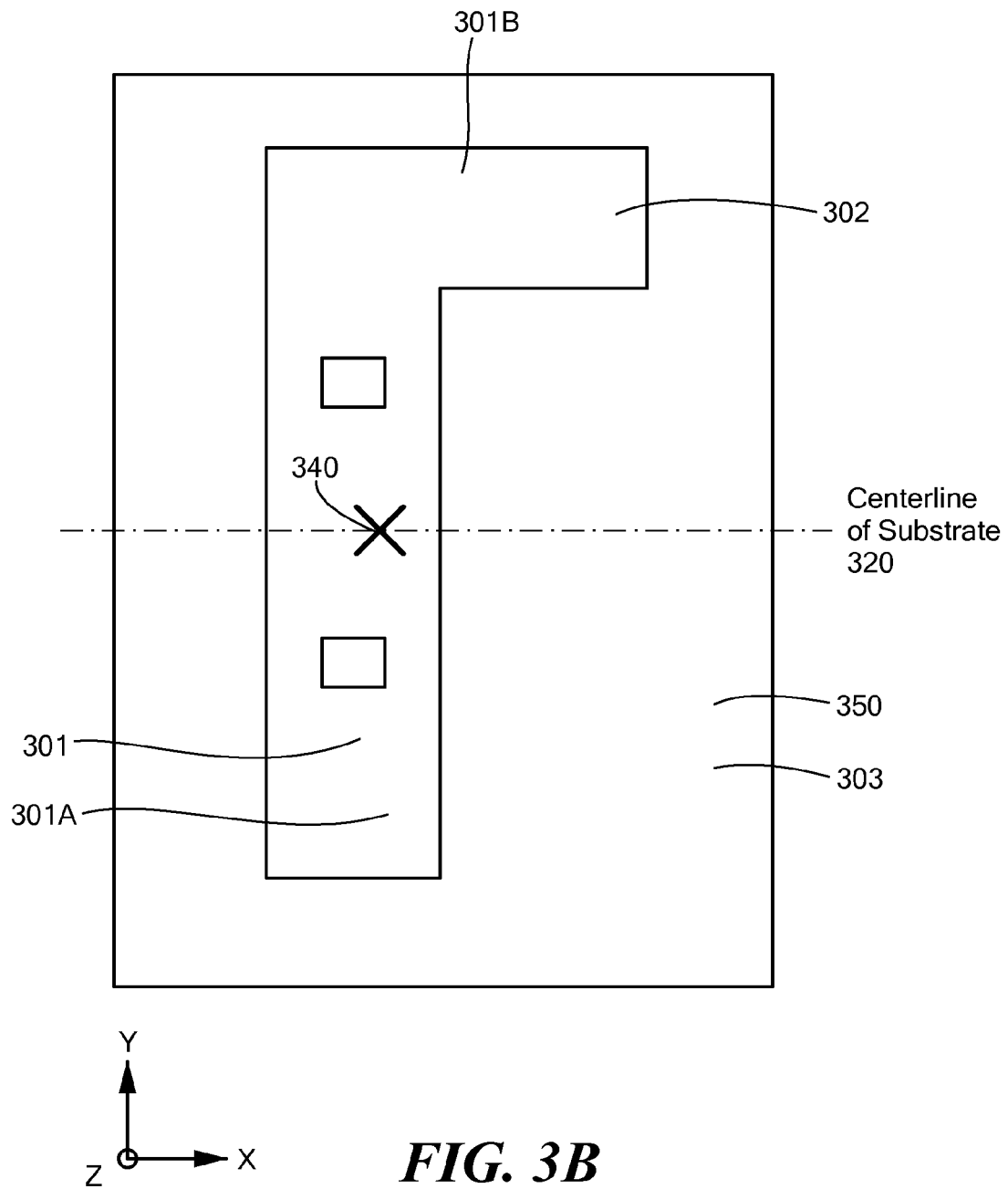
FIG. 3B shows a layout view of a tilt-mode accelerometer with an anchor centrally positioned on the substrate and an asymmetrically-shaped mass.

FIG. 3A shows a rectangular proof mass 300 that extends about the length of the substrate 310. The anchor 330 and the axis of rotation 320 are centrally positioned about the centerline of the substrate 310 halfway between edge 311 and edge 312. In order to provide a moment of inertia about the pivot axis of the proof mass where the anchor is centrally located about the length of the substrate, the proof mass 301 is preferably created with a mass asymmetry. In order to provide this mass asymmetry (moment of inertia) between a first side of the proof mass 300A and a second side of the proof mass 300B assuming a uniform material for the proof mass, the first side of the proof mass is made longer than the second side 300B. By requiring the anchor to be positioned about the center of the substrate, a portion of the substrate is unused 335.

FIG. 3B shows a proof mass with a mass asymmetry shaped like an "L". For the third dimension "Z", because of semiconductor layering processes, the proof mass is assumed to be of a substantially uniform thickness in the "Z" direction. Thus, in the present configuration, the asymmetry may be about the X-axis (as shown) or about the Y-axis.

In MEMS tilt-mode accelerometers in which the asymmetry is in the X-Y plane, for example as shown in FIG. 3B, a significant portion of the substrate is unused and may be considered to be "dead space" 350. In such a configuration, in general, the proof mass 301 resides on approximately half of the substrate 303. Thus, a large portion 350 of the substrate 303 is unused.

Figure 4A:
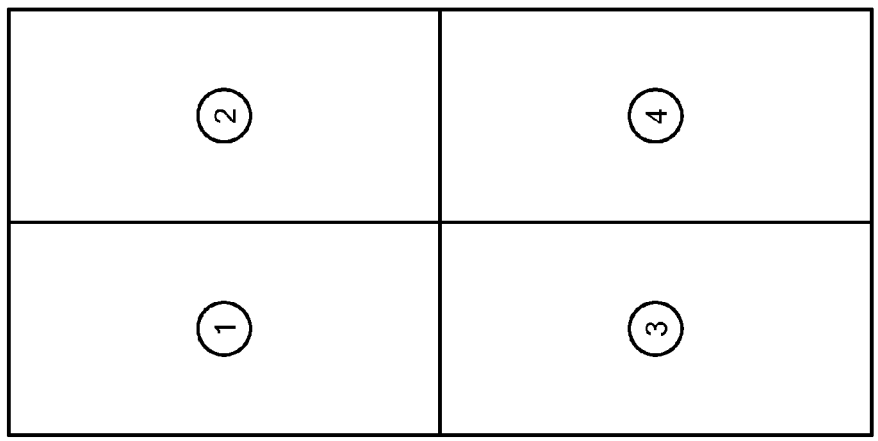
FIG. 4A show a quadrant layout of a MEMS die.
Figure 4:
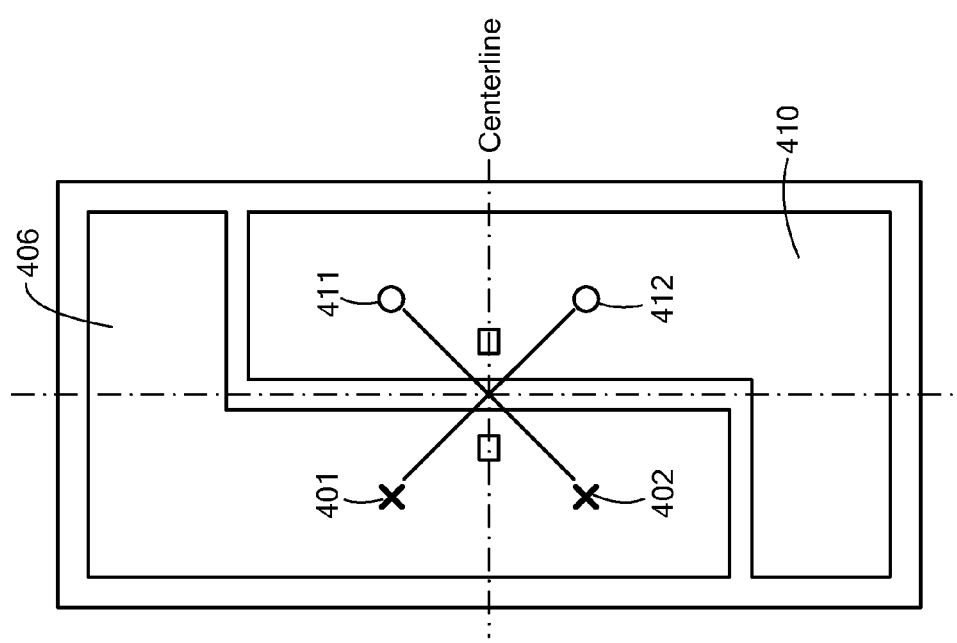
FIG. 4 shows a layout in which two tilt-mode accelerometers are positioned on a single die.

In one configuration as shown in FIG. 4, a second MEMS tilt-mode accelerometer can be created and added to the die without having to increase the overall size of the die. By filling in the space with two sensors 400, 410, each sensor can take advantage of the unused space opposite the mass asymmetry of the other sensor. The two accelerometers 400, 410 can be electrically coupled together in parallel (differentially), thus increasing the overall area of the proof mass. In this configuration, the two sensors operate as one large sensor. In such a configuration, the electrodes 401, 402 of the first sensor 400 are electrically cross-coupled to the electrodes 411, 412 of the second sensor. In one embodiment, electrode 401 is coupled to electrode 412 and electrode 402 is coupled to electrode 411 so that there is a symmetry about the axis of rotation, thus reducing errors due to manufacturing processes further. FIG. 4A shows how the die can be visualized as being divided into four separate quadrants. Returning to FIG. 4, the symmetries about the four quadrants in both the X and Y directions provide for a reduction in tensile and compressive forces for the accelerometer structure. It should be recognized that the tensile/compressive stresses on a die are symmetric about the center of the die. The tensile/compressive stresses experienced in quadrant 1 are offset by the tensile/compressive stresses in quadrant 4. Similarly, the tensile/compressive forces in quadrant 2 are offset by the tensile/compressive stresses in quadrant 3. Thus, the accelerometer system design with symmetrical properties between multiple electrically-coupled accelerometers on a single die is insensitive to stress effects both mechanical and atmospheric (e.g. humidity and temperature). Without the symmetry, the inherent deformation due to surface micromachining of the die would create a difference in the sensing of the two MEMS accelerometers and thus, a less accurate accelerometer system.

As a result, the overall performance (sensitivity) can be increased so that the two combined accelerometers will have comparable performance to a single sensor of the same total proof mass size, but with lower noise and reduced Brownian noise. In some embodiments of the invention, the electrodes of the two or more accelerometer sensors on the die may operate in common mode or the electrodes may be coupled so as to present a differential mode signal.

If the two accelerometers are operated in differential mode, the signal to noise ratio can be improved because of the random nature of the noise in comparison to the signal. Thus, the signal will correlate and the noise should be uncorrelated and cancel out. As is understood by one of ordinary skill in the art, information is sent only by the difference between the signals from the two or more accelerometer sensors on the die.

Given the extremely small size of MEMs structures, random molecular movement around the structure itself can create Brownian noise (e.g. random movement over time of the proof mass). The Brownian noise is related to the overall mass of the proof mass structure. Thus, by employing two asymmetrically-shaped tilt-mode sensors in the area previously occupied by a single symmetrically shaped tilt-mode sensor, the overall mass of the proof mass is doubled, thereby reducing the effective Brownian noise.

Figure 5:
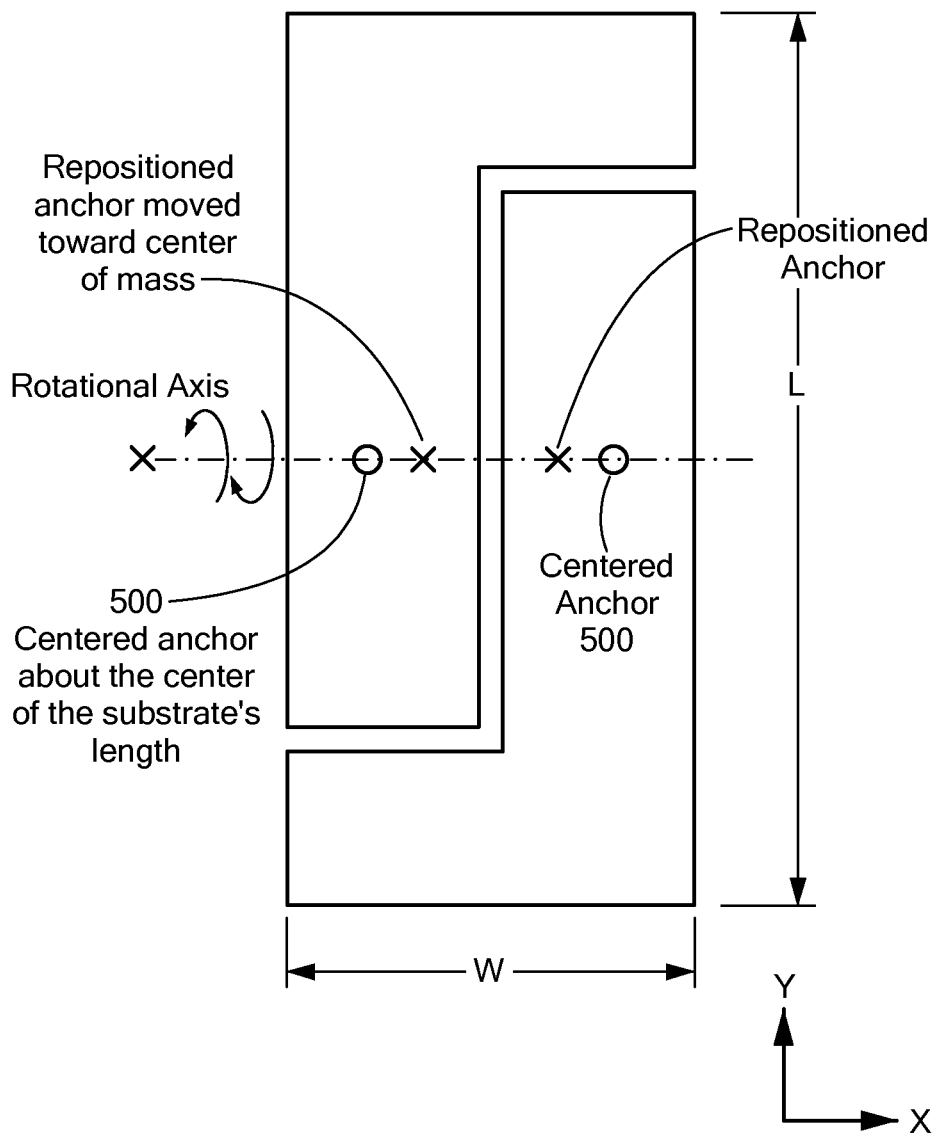
FIG. 5 shows the repositioning of the anchors of the MEMS tilt-mode accelerometer of FIG. 4 along the non-pivoting axis toward the center of mass.

It should be understood that the proof mass is suspended above the substrate by a suspension structure. The suspension structure includes an anchor that couples the suspension structure to the substrate and one or more torsional springs or other mechanical structures coupled between the substrate and the proof mass. As stated above, preferably there is a single anchor point. A further refinement of the accelerometer system can be achieved by moving each anchor closer to the center of mass along the pivoting axis. As shown in FIG. 5, the tilt-mode accelerometer pivots about the X-axis. Therefore, the anchor can be moved closer to the center of mass along the X-direction. See FIG. 5 where the anchor 500 is centered with respect to the Y-Axis at the "o" mark and is preferably moved toward the center of the die (i.e. toward the center of mass for the X-axis) toward the "x" mark. Due to the asymmetry about the Y axis, an acceleration along the Z-axis causes a torque about the Y axis. By moving the anchor in the X-direction, the torque about the Y axis is reduced and can be potentially eliminated making the accelerometer system less sensitive to torque about the Y-axis.

Figure 6A:
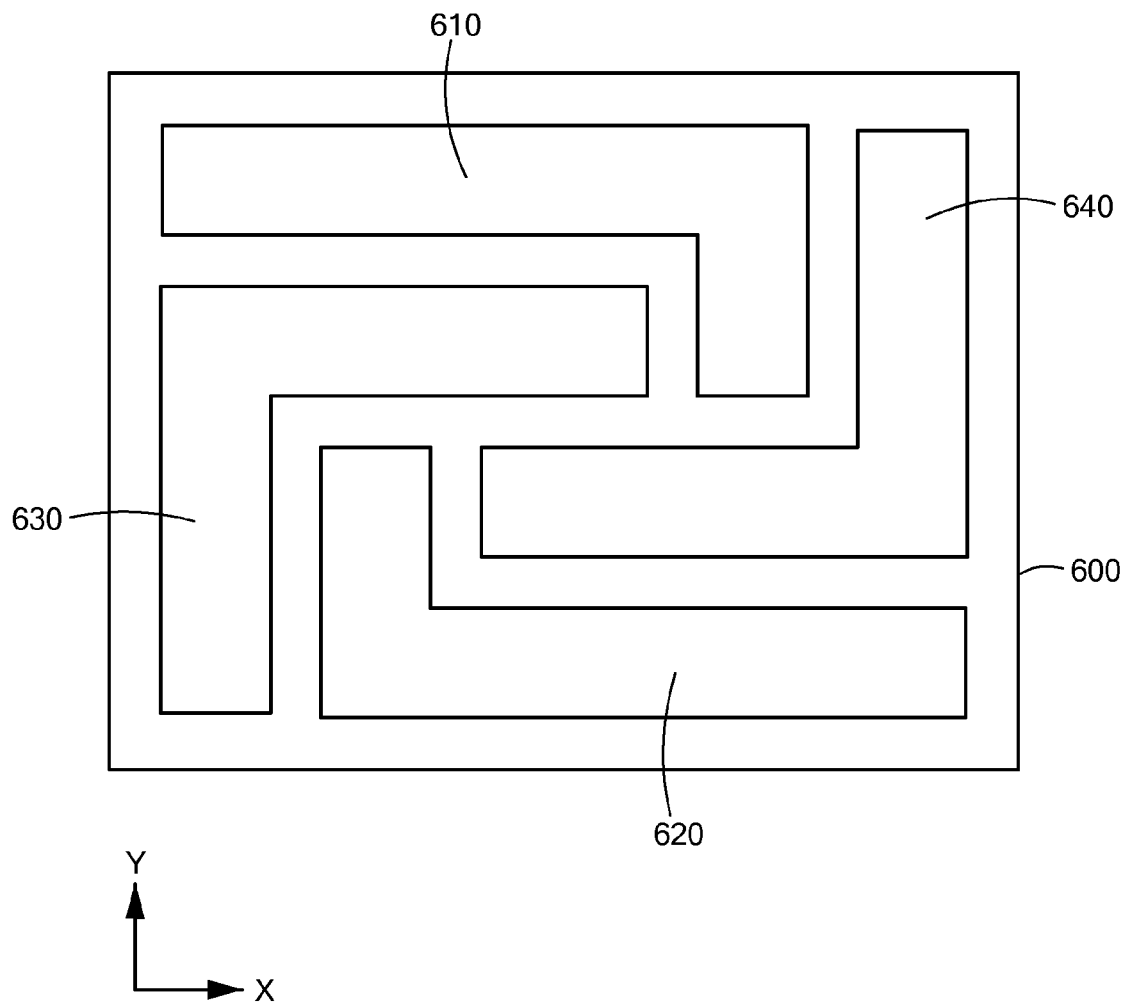
FIG. 6A shows a layout view of an embodiment of a MEMS accelerometer in which four sensors are symmetrically positioned on a single die.
Figure 6B:
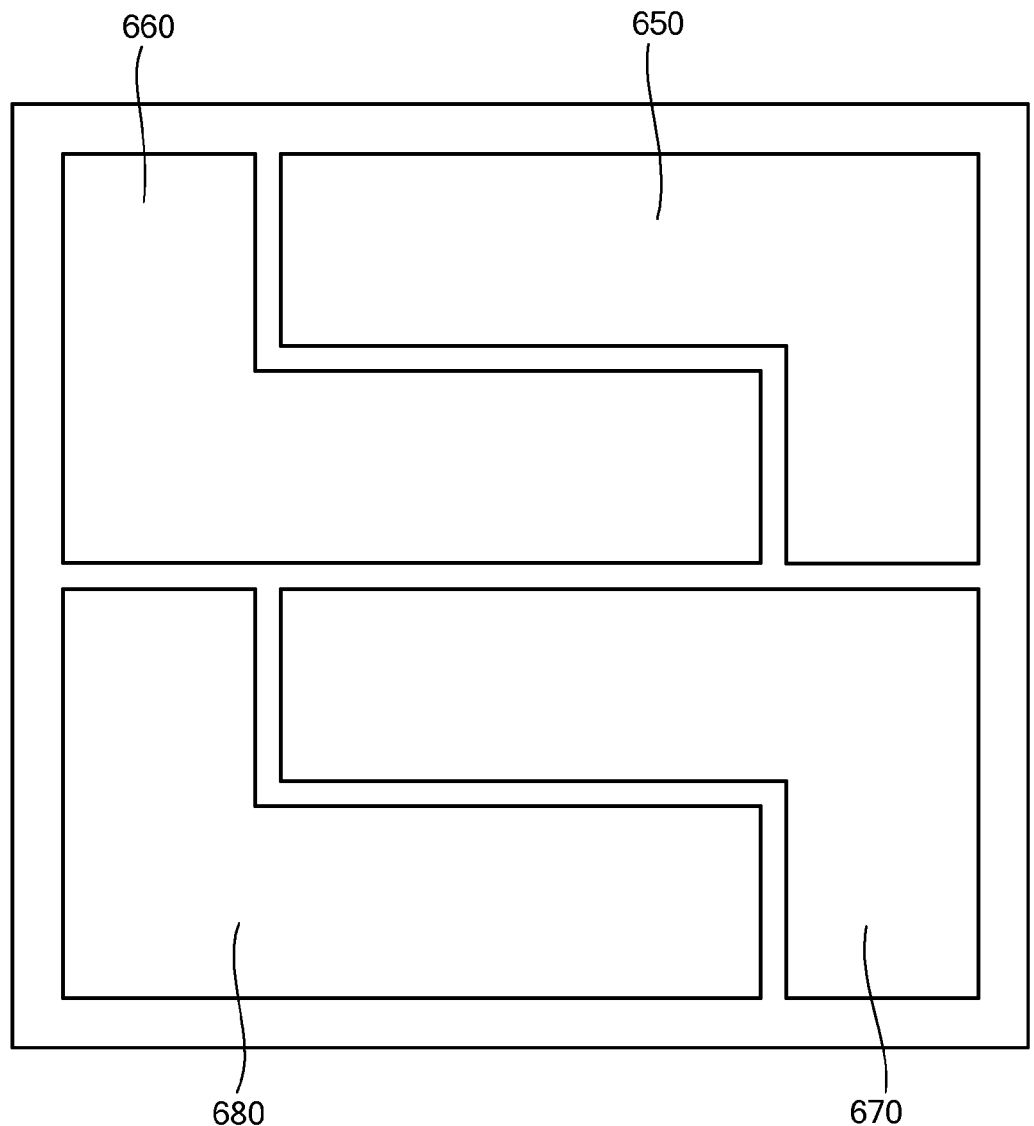
FIG. 6B shows a layout view of another embodiment of a MEMS accelerometer in which multiple sensors are symmetrically positioned on a single die.

FIGS. 6A and 6B show some alternative configurations of MEMS accelerometer systems in which multiple sensors are attached to the same die and where there are symmetries about one or more axes with respect to the layout of the sensors. As shown in FIGS. 6A and 6B there may be more than two acceleration sensors on a single die. FIG. 6A shows 4 L-shaped proof masses. It should be understood by one of ordinary skill in the art that the "L-shaped" proof mass is shown for exemplary purposes and other asymmetrical shapes may be used for the proof mass. In FIG. 6A, proof masses (610 and 620) and (630 and 640) are symmetrical to one another, such that symmetry exists for the proof mass structures about both the X and Y axes. FIG. 6B shows an embodiment in which four sensors are positioned on a single die. In this configuration, like in FIG. 6A, symmetry exists for the proof mass structures 650, 660, 670 and 680 about both the X and Y axes. By being symmetric about an axis, the stresses from tensile and compressive forces are balanced about that axes.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A single-axis tilt-mode microelectromechanical accelerometer structure for measuring acceleration along a single axis, the accelerometer structure comprising:
   a substrate having a top surface defining a plane;
   a first asymmetrically-shaped mass suspended above the substrate pivotable about a first pivot axis and asymmetric about a first non-pivot axis, the first pivot axis and the first non-pivot axis being within a plane parallel to the plane of the substrate;
   a first suspension structure mechanically coupled to the first asymmetrically shaped mass and the substrate, the first suspension structure positioned substantially at the center of mass about the first non-pivot axis of along the first pivot axis of the first asymmetrically shaped mass.

2. A single-axis tilt-mode microelectromechanical accelerometer structure according to claim 1, wherein the first non-pivot axis is perpendicular to the first pivot axis.

3. A single-axis tilt-mode microelectromechanical accelerometer structure according to claim 1, further comprising a second asymmetrically-shaped mass, the second asymmetrically shaped mass pivotable about a second pivot axis and asymmetrical about a second non-pivot axis wherein the second pivot axis and the non-pivot axis reside within the plane parallel to the plane of the substrate.

4. A single-axis tilt-mode microelectromechanical accelerometer structure according to claim 1, further comprising a second suspension structure mechanically coupled to the second asymmetrically-shaped mass, the second suspension structure positioned substantially at the center of mass of the second pivot axis of the second asymmetrically shaped mass.

5. A single-axis tilt-mode microelectromechanical accelerometer structure according to claim 3, further including:

a first anchor centrally positioned with respect to the first and second ends of the substrate and mechanically coupled to the first asymmetrically-shaped mass; and a second anchor centrally positioned with respect to the first and second ends of the substrate and mechanically coupled to the second asymmetrically-shaped mass.

6. A single-axis tilt-mode microelectromechanical accelerometer structure according to claim 3 wherein the second mass is suspended above the substrate using one anchor.

7. A single-axis tilt-mode microelectromechanical accelerometer structure according to claim 3 wherein the first mass and the second mass each define a separate tilt-mode accelerometer.

8. A single-axis tilt-mode microelectromechanical accelerometer structure according to claim 3 further comprising: a first set of electrodes positioned on the substrate and below the first asymmetrically-shaped mass wherein the first set of electrodes includes a plurality of electrodes that are equally positioned from the first pivot axis on the substrate.

9. A single-axis tilt-mode microelectromechanical accelerometer structure according to claim 8 further comprising a second set of electrodes wherein the second set of electrodes includes a plurality of electrodes that are equally positioned from the second pivot axis on the substrate.

10. A single-axis tilt-mode microelectromechanical accelerometer structure according to claim 9 wherein the first pivot axis and the second pivot axis are the same axis.

11. A single-axis tilt-mode microelectromechanical accelerometer structure according to claim 10 wherein the first set of electrodes includes at least two electrodes that are each equally positioned on opposite sides of the pivot axis and the second set of electrodes includes at least two electrodes that are each equally positioned on opposite sides of the pivot axis wherein an electrode from the first set of electrodes is cross-coupled with an electrode from the second set of electrodes on an opposite side of the pivot axis.

12. A single-axis tilt-mode microelectromechanical accelerometer structure according to claim 9 wherein the first and second sets of electrodes are electrically coupled in a differential mode.

13. A single-axis tilt-mode microelectromechanical accelerometer structure according to claim 1 wherein the first mass is suspended above the substrate using one anchor.

14. A single-axis tilt-mode microelectromechanical accelerometer structure comprising:
a substrate having a top surface;
a first tilt-mode sensor having an asymmetrically-shaped mass having a first pivot axis and a first non-pivot axis, the first pivot axis and the first non-pivot axis in a plane substantially parallel to the top surface of the substrate, the mass being asymmetrical about the first non-pivot axis and the first tilt-mode sensor coupled by an anchor to the substrate; and
a second tilt-mode sensor having an asymmetrical-shaped mass having a second pivot axis and a second non-pivot axis, the second pivot axis and the second non-pivot axis in a plane substantially parallel to the top surface of the substrate, the mass being asymmetrical about the second non-pivot axis and coupled by an anchor to the substrate;
and wherein the anchor of the first tilt-mode sensor is positioned substantially at the center of mass about the first non-pivot axis along the first pivot axis of the asymmetrically shaped mass.

15. A single-axis tilt-mode microelectromechanical accelerometer structure according to claim 14 further comprising:
circuitry electrically coupled to a first set of electrodes and to a second set of electrodes and to the first mass and the second mass, the circuitry configured to sense rotational movement of the first mass about an X-axis caused by Z-axis accelerations via changes in capacitance between the first mass and the corresponding first set of electrodes and sense rotational movement about the X-axis of the second mass caused by Z-axis accelerations via changes in capacitance between the second mass and the corresponding second set of electrodes wherein the first and second masses have an asymmetry about a Y-axis.

16. A single-axis tilt-mode microelectromechanical accelerometer structure for measuring acceleration along a single axis, the accelerometer structure comprising:
a substrate having a top surface defining a plane;
a first asymmetrically-shaped mass suspended above the substrate pivotable about a first pivot axis and asymmetrical about a first non-pivot axis where the first pivot axis and the first non-pivot axis reside in a plane substantially parallel to the top surface of the substrate;
a suspending means mechanically coupled to the first asymmetrically shaped mass and the substrate, the suspending means positioned substantially at the center of mass of the first non-pivoting axis of the first asymmetrically shaped mass.

17. A single-axis tilt-mode microelectromechanical accelerometer structure according to claim 16, further comprising a second asymmetrically-shaped mass suspended above the substrate pivotable about the first pivot axis and asymmetrical about a second non-pivot axis wherein the first pivot axis and the second non-pivot axis reside in a plane substantially parallel to the top surface of the substrate.

18. A single-axis tilt-mode micromechanical accelerometer structure according to claim 17, further comprising:
a suspending means mechanically coupled to the second asymmetrically shaped mass and the substrate, the suspending means positioned substantially at the center of mass of a non-pivot axis of the second asymmetrically shaped mass along the first pivot axis.

19. A single-axis tilt-mode microelectromechanical accelerometer structure according to claim 18 further comprising: a first set of electrodes positioned on the substrate and below the first asymmetrically-shaped mass.

20. A single-axis tilt-mode microelectromechanical accelerometer structure according to claim 19 further comprising a second set of electrodes positioned on the substrate and below the second asymmetrically-shaped mass.

21. A single-axis tilt-mode microelectromechanical accelerometer structure according to claim 20 wherein an electrode from the first set of electrodes is cross-coupled with an electrode from the second set of electrodes on an opposite side of the pivot axis.

\* \* \* \* \*

UNITED STATES PATENT AND TRADEMARK OFFICE
CERTIFICATE OF CORRECTION

PATENT NO. : 9,297,825 B2
APPLICATION NO. : 13/785624
DATED : March 29, 2016
INVENTOR(S) : Xin Zhang et al.

Page 1 of 1

It is certified that error appears in the above-identified patent and that said Letters Patent is hereby corrected as shown below:

In the claims,
In Col. 8, line 48
replace "axis of along"
with --axis along--

In Col. 8, line 61
replace "claim 1"
with --claim 3--

Signed and Sealed this
Fourteenth Day of June, 2016

Michelle K. Lee
*Director of the United States Patent and Trademark Office*